United States Patent [19]

Freeze

[11] Patent Number: 5,003,415
[45] Date of Patent: Mar. 26, 1991

[54] ADAPTIVE HEAD POSITIONING SERVO-MECHANISM

[75] Inventor: Robin J. Freeze, Milpitas, Calif.
[73] Assignee: Qume Corporation, Milpitas, Calif.
[21] Appl. No.: 65,419
[22] Filed: Jun. 18, 1987
[51] Int. Cl.⁵ ............... G11B 21/08; G05D 23/275
[52] U.S. Cl. ............... 360/78.06; 360/77.04; 360/78.12; 369/32; 369/44.32; 318/561; 318/632
[58] Field of Search ............ 360/77, 78, 77.02–77.11, 360/77.01, 78.01, 78.04–78.15; 369/32, 33, 41, 43, 44, 44.11, 44.27, 44.28, 44.32; 318/561, 592, 594, 617, 632, 634, 636, 646, 687, 626; 358/342, 907

[56] References Cited

U.S. PATENT DOCUMENTS

| | | | |
|---|---|---|---|
| 4,166,970 | 9/1979 | Cardot et al. | 318/561 |
| 4,270,073 | 5/1981 | Harman | 318/632 |
| 4,371,960 | 1/1983 | Kroiss | 360/77.02 |
| 4,566,046 | 1/1986 | Fujiki et al. | 360/78 |
| 4,697,213 | 9/1987 | Kitamura | 360/77.02 |
| 4,698,796 | 10/1987 | Kimura | 369/44 |
| 4,724,370 | 2/1988 | Moraru et al. | 318/561 |

FOREIGN PATENT DOCUMENTS

| | | | |
|---|---|---|---|
| 55-113173 | 9/1980 | Japan | 360/78 |
| 59-101071 | 6/1984 | Japan | 360/78.06 |
| 59-178656 | 10/1984 | Japan | 360/77.02 |
| 60-35377 | 2/1985 | Japan | 360/77.02 |

Primary Examiner—Aristotelis M. Psitos
Assistant Examiner—Steven R. Garland
Attorney, Agent, or Firm—Ladas & Parry

[57] ABSTRACT

A servo system for compensating for environmental forces acting on, for example, a disk drive. A circuit is provided for causing an electrical current to flow in the voice coil controlling a read/write head; the head is caused to seek a predetermined track; and a device adjusts the current delivered to the voice coil so that the force generated thereby at least approximately balances environmental forces acting upon the voice coil so that the read/write head does not move by more than a predetermined amount from said predetermined track.

17 Claims, 9 Drawing Sheets

ADAPTIVE HEAD POSITIONING SERVO-MECHANISM

CROSS REFERENCE TO RELATED APPLICATION

The present invention is related to the head positioning servo-mechanism disclosed in U.S. patent application Ser. No. 935,687, now U.S. Pat. No. 4,879,612, filed Nov. 26, 1986. The disclosure of patent application Ser. No. 935,687 filed Nov. 26, 1986 is incorporated herein by reference.

BACKGROUND OF THE INVENTION

The instant invention is concerned with improvements to a servo-mechanism of the type which may be used with a disk drive to cause the read/write head to be moved from track to track on the disk installed in the disk drive. This operation is usually called a "head seek" in the parlance of the disk drive industry since the read/write head is caused to seek a new track in response to a "seek command". The disk installed in the disk drive can either be a permanently installed disk (in which case the disk is usually a "hard disk") or a removable disk (in which case the disk is most often a "floppy disk" although removable hard disks are known.)

The data recorded on the disks are typically recorded in concentric tracks and the read/write head is caused to move between tracks by the aforementioned seek command. The data are stored in a media which may be coated on a disk substrate and the media usually stores the data magnetically, although optical means for data stored are also well known.

In the prior art, both stepper motors and D.C. motors controlled by servo systems have been used to move the read/write head from track to track. Stepper motors are used in the prior art since they are relatively inexpensive and easy to control. D.C. motors and servo systems have been used in the prior art, although they tend to be more complicated than stepper motors systems, since they have faster seek times. That is, the performance of the servo systems is higher than the performance of stepper motor systems and, not surprisingly, the cost of servo motor systems tends to be higher than the cost of stepper motor systems.

In the prior art, disk drives have normally been operated on a flat, horizontal surface, such as a desk top. Sometimes the drive itself has been operated vertically, but more often it has been operated horizontally. In any event, the carriage on which the read/write head is disposed has been arranged horizontal to the horizontal surface of the desk so that the servo system does not have to operate against the force of gravity. Recently, there have been introduced portable personal computer systems which can either operate horizontally or which can be operated at an angle to the horizontal. Typically, such portable personal computer systems have feet disposed along the front edge thereof which may be selectively pulled down such as to rotate the portable personal computer system ten to fifteen degrees with respect to the horizontal. Such portable personal computer systems typically have disk drives and a monitor built into them and, if the monitor is angled upwardly, it makes for easier viewing by the user of the portable personal computer.

Apparently, due to the small size of these personal portable computers, it is preferable to rotate the entire portable personal computer, including built-in monitor, as opposed to trying to angle the monitor with respect to the case which holds the computer and monitor. Rotating the personal computer means that its installed disk drive is also rotated. If the disk drive is a high performance disk drive, it likely has a servo control system, and if rotating the disk drive causes the servo control system to operate either with or against gravity (depending on which way the read/write head is moved), the performance of the servo control system is likely to degrade, or worse, the drive will fail.

Also, in the prior art servo control systems, the read/write head is acted upon by a flex cable having a spring constant which is assumed to be equal to zero. In practice, the spring constant is not ideal spring and therefore its spring "constant" is, in actuality, a variable which varies (from zero) as a function of track position. However, since prior art servo systems have assumed this variable to be a constant, the performance of such systems is less than it could be.

As a result, there is a need to be able to operate a disk drive not only at the horizontal, but at various angles to the horizontal. While disk drives which use stepper motors may have little difficulty in operating at the horizontal and at various angles thereto, disk drives which use servo-mechanisms to control the position of their read/write heads operate very well in the normal horizontal position, but when rotated to the horizontal, their performance tends to degrade and at high enough angles they can become inoperable. As the performance of personal computers improves, it is desirable to equip them with high performance disk drives, such as disk drives which use a servo-mechanism to control the read/write head thereof. As a result, there is a need for a head positioning servo-mechanism which can be used in a drive which may be either used at the horizontal or at an angle thereto.

There is also a need for an improved servo control system which can compensate for the fact that the flex cable is not an ideal spring, but rather has a spring "constant" which varies from zero.

BRIEF DESCRIPTION OF THE INVENTION

Briefly, and in general terms, the invention provides a servo system for controlling a workpiece, such as a read/write head of a disk drive. The servo system includes a circuit for causing an electrical current to flow in a voice coil controlling a read/write head. The read/write head is caused to seek a predetermined track and the current delivered to the voice coil is adjusted so that the force generated thereby at least approximately balances environmental forces acting upon the voice coil so that the read/write head does not move by more than a predetermined amount from said predetermined track.

DETAILED DESCRIPTION OF A PREFERRED EMBODIMENT

Figure 1:
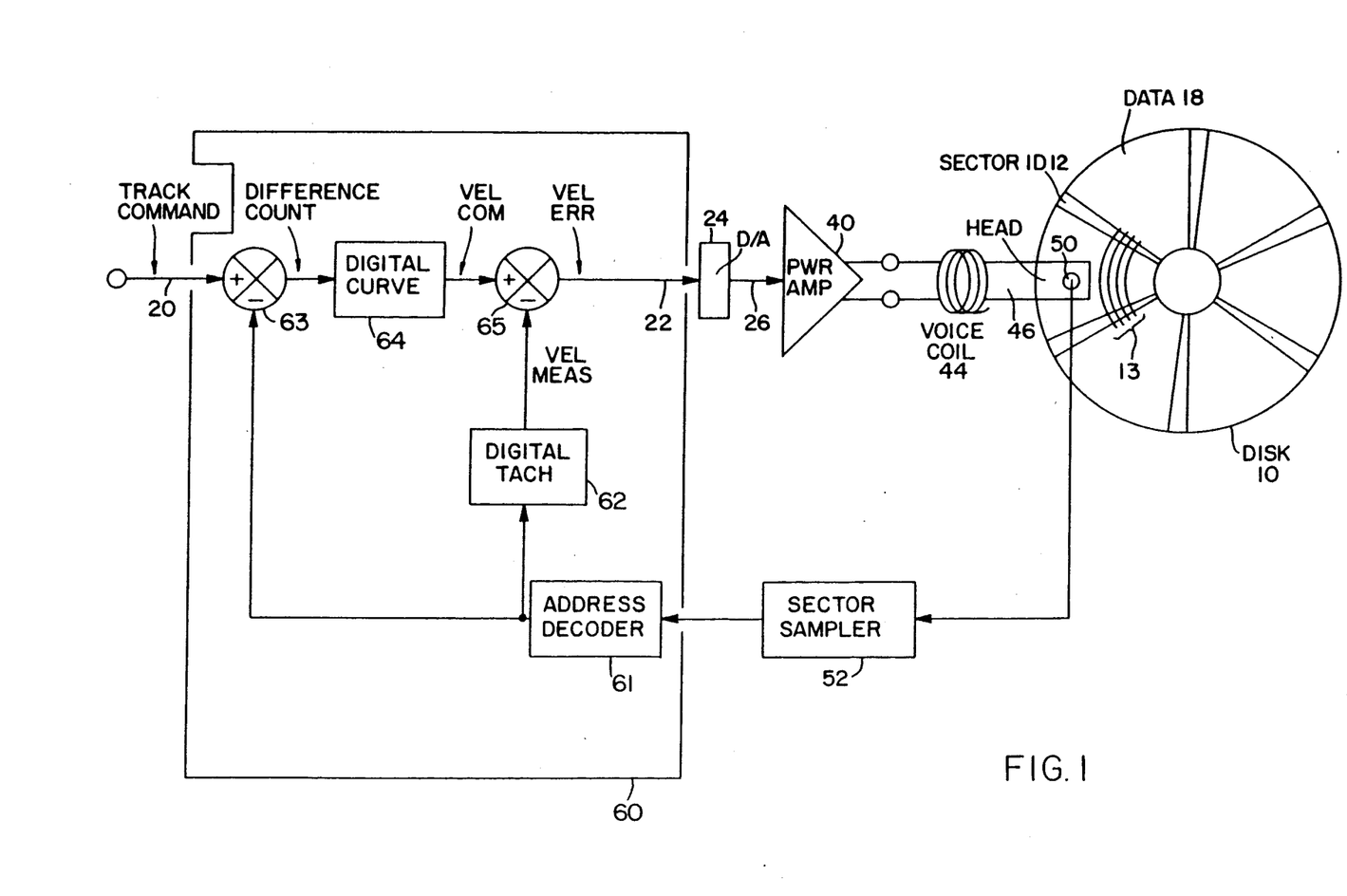
FIG. 1 is a block diagram of a digital servo system of the type with which the present invention may be used.

FIG. 1 is a block diagram of a digital servo system of the type with which the present invention may be used. The block diagram of FIG. 1 depicts how the servo-mechanism operates in its velocity mode. The servo-mechanism typically also has a position mode of operation to which it shifts near the end of its response to a seek command. That is to say, the servo-mechanism operates in a velocity mode in order to move from a present track to a commanded track and once it arrives in the vicinity of the commanded track, it shifts to a position mode of operation. Both the position mode and the velocity mode of operation are described in detail in U.S. patent application Ser. No. 935,687 filed Nov. 26, 1986, the disclosure of which is incorporated herein by reference.

The velocity mode servo is preferably implemented using a suitably programmed microprocessor 60. The microprocessor 60 is responsive to a commanded track position data signal 20 and outputs a velocity error or desired acceleration signal 22. The desired acceleration signal is applied to a digital to analog (D-A) converter 24 which converts the digital signal output by the microprocessor 60 into an analog signal 26. The analog signal 26 is eventually applied (through additional electronics which are described in U.S. patent application Ser. No. 935,687, filed Nov. 26, 1986) to power amplifier 40. Power amplifier 40 drives voice coil 44 which mechanically moves the armature 46 upon which the read/write head 50 is disposed. The voice coil 44 is a type of DC motor.

The sensitive surface of the read/write head 50 is disposed adjacent a moving data storage media, preferably in the form of disk 10. Disk 10 can either be a hard disk or a floppy disk. Preferably, and in either case, the disk is coated with a high density magnetic media capable of storing data written thereto by the read/write head 50. As is well known, the disk is rotated by a motor (not shown here) associated with the disk drive. Those skilled in the art will appreciate that the type of media with which the present invention is used is a matter of design choice. For example, the present invention can also be used with optical storage devices as well as magnetic storage devices.

Preferably, data is written on the disk in concentric tracks 13 and each track is divided into a number of data sectors 18 and identification sectors 12. For the ease of illustration, the number of data sectors 18 and identification sectors 12 shown in FIG. 1 are only six per track. However, those skilled in the art will appreciate that in actual commercial embodiments, many more data sectors and identification sectors are used, and, indeed, in accordance with a preferred embodiment of the invention, seventy-eight data sectors and identification sectors are found on each concentric track. Similarly, only a few tracks 13 are schematically depicted in FIG. 1, also for the ease of illustration. In accordance with the preferred embodiment of the invention, three hundred and one tracks are preferably used on each side of the disk. Of course, the number of sectors per track and the number of tracks per side, whether one or both sides of the disk are recorded upon and whether one or a number of disks 10 are spindled together are matters of design choice. If both sides of the disk 10 are recorded upon or if more than one disk 10 are utilized, then preferably multiple read/write heads 50 will be employed, one for each side of each disk and appropriate switching mechanisms will be used to control which read/write head 50 is in service at a given time. All of the read/write heads 50 can be controlled by one servo-mechanism or each read/write head 50 can be controlled by its own servo-mechanism or some combination of the foregoing.

The read/write head 50 reads the sector identification information 12, data 18 and other information recorded upon the surface of the disk 10 and provides that information to, among other things, sector ID sampler 52 which, in turn, supplies certain data to microprocessor 60. The type of data supplied by sampler 52 is described in U.S. patent application Ser. No. 935,687 filed Nov. 26, 1986.

Microprocessor 60 is programmed preferably with firmware, to act as a velocity servo. It provides an address decoder 61 responsive to sector sampler 52 for providing decoded digital track and sector address information to a digital tachometer 62 and to a summing junction 63 which provides a count which is the difference between the commanded track and the decoded track to a digital curve look-up table 64. A commanded velocity term is output from 64 to summing junction 65. Summing junction 65 is also responsive to the output of digital tachometer 62 and generates a velocity error signal (or acceleration signal) 22 which is output to D-A convertor 24.

Figure 2:
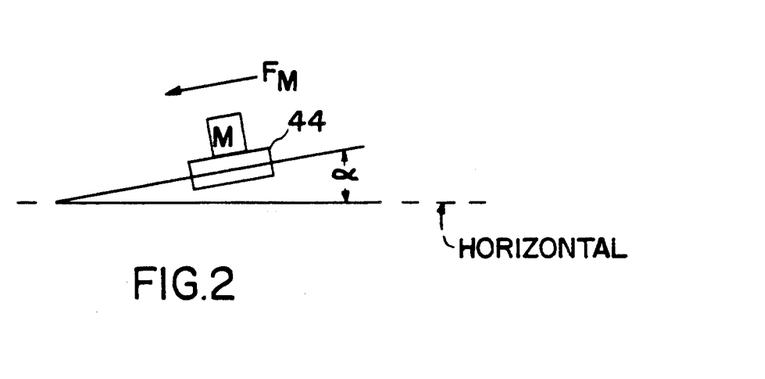
FIG. 2 is a schematic representation of a voice coil disposed at an angle to the horizontal.

FIG. 2 is a schematic representation of voice coil 44 installed in a disk drive which is disposed at an angle (alpha) from the horizontal. The head, its carriage (which is controlled by the voice coil) and the voice coil itself, have a certain amount of mass which is represented by the letter M. If the angle of rotation of the disk drive is such as to cause the voice coil 44 to be positioned at an angle with respect to the horizontal, a force $F_M$, due to the mass of the read/write head, its carriage and moving portions of the voice coil, will result in the downhill direction. When a current is supplied to the voice coil 44, a force, $F_C$ is generated which moves the voice coil and the mass (M) carried thereby. The flex cable imposes its own force, $F_{FC}$, on the read/write head. Depending upon the direction in which the read/write head is moved, and the direction in which the flex cable operates, the total force, $F_T$, acting on the mass M is $F_C$ plus or minus $F_M$ plus or minus $F_{FC}$. As a result, the moving mass, M, of the voice coil 44, read/write head 50 and associated carriage, will apt to be too fast when moving downhill (because it accelerates too much) and apt to be too slow when moving uphill (because it accelerates too little). Those skilled in the art will appreciate that in servo-mechanisms of the present type, the moving mass is intended to follow a predetermined speed vs. tracks-to-go (the distance from the present track to the commanded track) profile which is stored as the digital curve 64.

Figure 3:
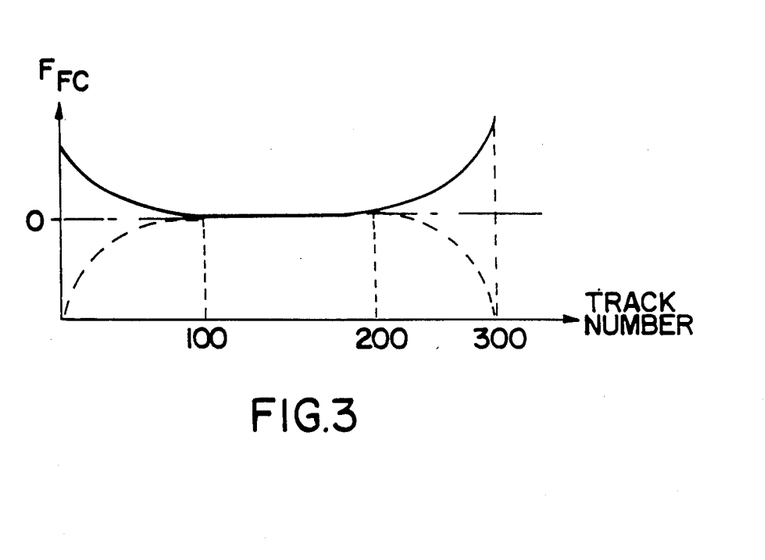
FIG. 3 is a graph of the force $F_{FC}$ exerted by a flex cable versus track position.

Those skilled in the art will appreciate that the flex cable (not shown) ideally provides a constant force $F_C$ equal to zero on the moving mass, M. In actual practice, however, the force supplied by the flex cable is neither zero nor constant, but rather tends to be a function of track position. FIG. 3 is a graph of this function for a disk drive which has three hundred and one tracks. For the flex cable actually used with the present invention, the force is shown as a solid line and it tends to increase as the track numbers increase. Other flex cables can vary from the ideal zero force case by imposing a force at the lower track numbers or at both high and low track numbers. The force imposed can act in either (or both) direction(s), and these different possible forces are shown by dashed lines in FIG. 3. Thus the flex cable can, or does, act as a spring. The present invention can compensate for the forces imposed by such flex cables.

The present invention adapts the servo-mechanism to permit the disk drive to be used at various angles to the horizontal. It does this by measuring the force $F_C$ needed to be applied by the servo-system in order to maintain the mass, M, essentially stationary on its armature A. This force should be equal to the force necessary to balance the force $F_M$ imposed by the mass M, when the disk drive is disposed at an angle, plus or minus the force $F_{FC}$ imposed by the flex cable. Given the fact that the force $F_{FC}$ imposed by the flex cable tends not to be exactly constant over the entire width of the disk 10, (i.e., over all of the tracks), the force $F_C$ needed to balance $F_{FC}$ and $F_M$ is preferably measured at a plurality of different track locations and, with respect to the preferred embodiment, it is measured for three different locations, namely, at tracks 50, 150, and 280. The locations are concentrated at the high track numbers given the nature of the flex cable used in the preferred embodiment. Those skilled in the art will appreciate that this results in only an approximation of the force vs. track position profile described with respect to FIG. 3. Of course, by using more than three data points, a closer approximation can be had and a different set of track locations would likely be selected depending upon the nature of the flex cable actually used when practicing this invention. Generally speaking, it will be desireable to have the track locations which are tested concentrated where the greatest changes in the $F_{FC}$ curve (FIG. 3) are expected to occur.

While it only takes a very small period of time to carry out the method of the present invention, it does take a finite period of time and, therefore, the more tracks which are sampled for the purpose of carrying out the method, the greater total period of time it will take to carry out the instant invention. Preferably, the instant invention is utilized every time the computer to which the drive is coupled is booted. However, those skilled in the art will appreciate that how often the present invention is utilized is a matter of choice. For example, it might be used as seldom as each time the computer is energized or as frequently as each time a disk is changed or reset. In practicing the instant invention, a choice also must be made whether to use more (fewer) data points to gain (lose) accuracy, but with an increase (reduction) in the amount of time required to practice the invention.

Figure 4:
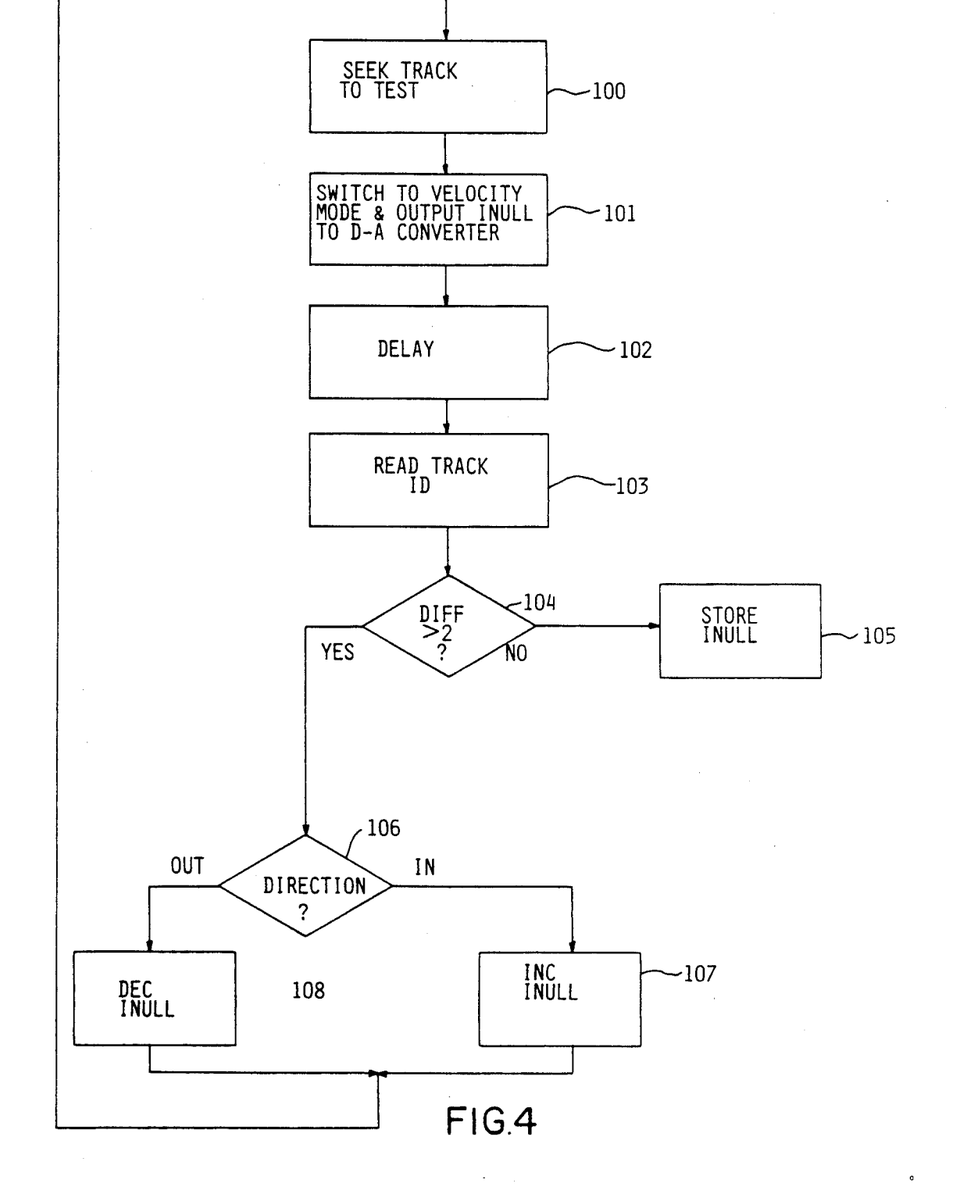
FIG. 4 is a simplified flow diagram of one embodiment of the invention.

The present invention is preferably implemented using a suitable microprocessor 60. FIG. 4 is a very simple flow diagram which gives an overall picture of how the present invention can be implemented. At block 100, the read/write head is caused to seek a predetermined track, which, in the practice of the present invention, has been selected to be initially track 50. Thereafter, the microprocessor outputs to its D-A converter 24 a predetermined digital value INULL. The initial value of INULL can be zero or any other preselected value. At essentially the same time, the servo mechanism is switched to its velocity mode of operation so that it does not try to follow the predetermined track (as it would in its position mode of operation). If the originally selected value of INULL does not create a force $F_C$ which is balanced by the force $F_{FC}$ supplied by the flex cable and the force $F_M$ supplied by the mass of the read/write head then, during the delay time of block 102, the head will move off the predetermined track. The next step, which occurs after the predetermined delay time period of block 102, is to read the track number over which the read/write head is then disposed (see block 103). Of course, if the track number read at block 103 is different than the predetermined track sought at block 100, then the value of INULL may need adjustment.

For the purposes of the instant invention, it has been determined that if the difference between the track number read at step 103 and the predetermined track sought at step 100 is no more than one track, then the value of INULL is sufficiently close to its ideal value for the predetermined track and therefore the current value of INULL may be stored at block 105 for subsequent use.

If the difference at block 104 exceeds one track, then the value of INULL needs adjustment. If the direction as determined at block 106 is inward, then the value of INULL is increased or incremented at block 107. If, on the other hand, the direction is outward, then the value of INULL is decreased or decremented at block 108. After adjusting the value of INULL, the predetermined track selected for test purposes is again sought at block 100 and the process is reiterated until an appropriate value of INULL is found for the track under test and is stored at block 105.

As previously indicated, this testing is preferably done with three different track locations and, therefore, when the testing of FIG. 4 is first accomplished for track number fifty, then a value of INULL would be stored for track number fifty and the test would next be accomplished for track number 150. Of course, a new value of INULL would be determined as the correct value for track number 150 and the steps of FIG. 4 would again be repeated for track number 280. As previously indicated, the number of tracks which are tested is a matter of design choice as is the selection of the particular track numbers where the testing of FIG. 4 is accomplished.

The value of INULL is a value which, when applied to the D-A convertor 24 and the voice coil 44, causes the voice coil to essentially stand still when in the velocity mode. When seeking a new commanded track, the value which is applied to the D-A convertor 24 and thence to the voice coil 44 is taken from a digital lookup table or digital curve 64 which is preferably stored in the firmware controlling microprocessor 60. The lookup table accepts a tracks-to-go signal and outputs a commanded velocity signal which is thereafter corrected by the value of INULL for the current track position and, after correction, it is outputted to the D-A convertor 24 for application to the voice coil 44. Of course, the further the head has to move to its commanded track during a seek command, the greater the number of tracks to go and therefore the greater the commanded velocity. See, for example, FIG. 4 of U.S. patent application Ser. No. 935,687 and the discussion pertaining thereto for a further discussion of the stored digital curve.

Figure 5A:
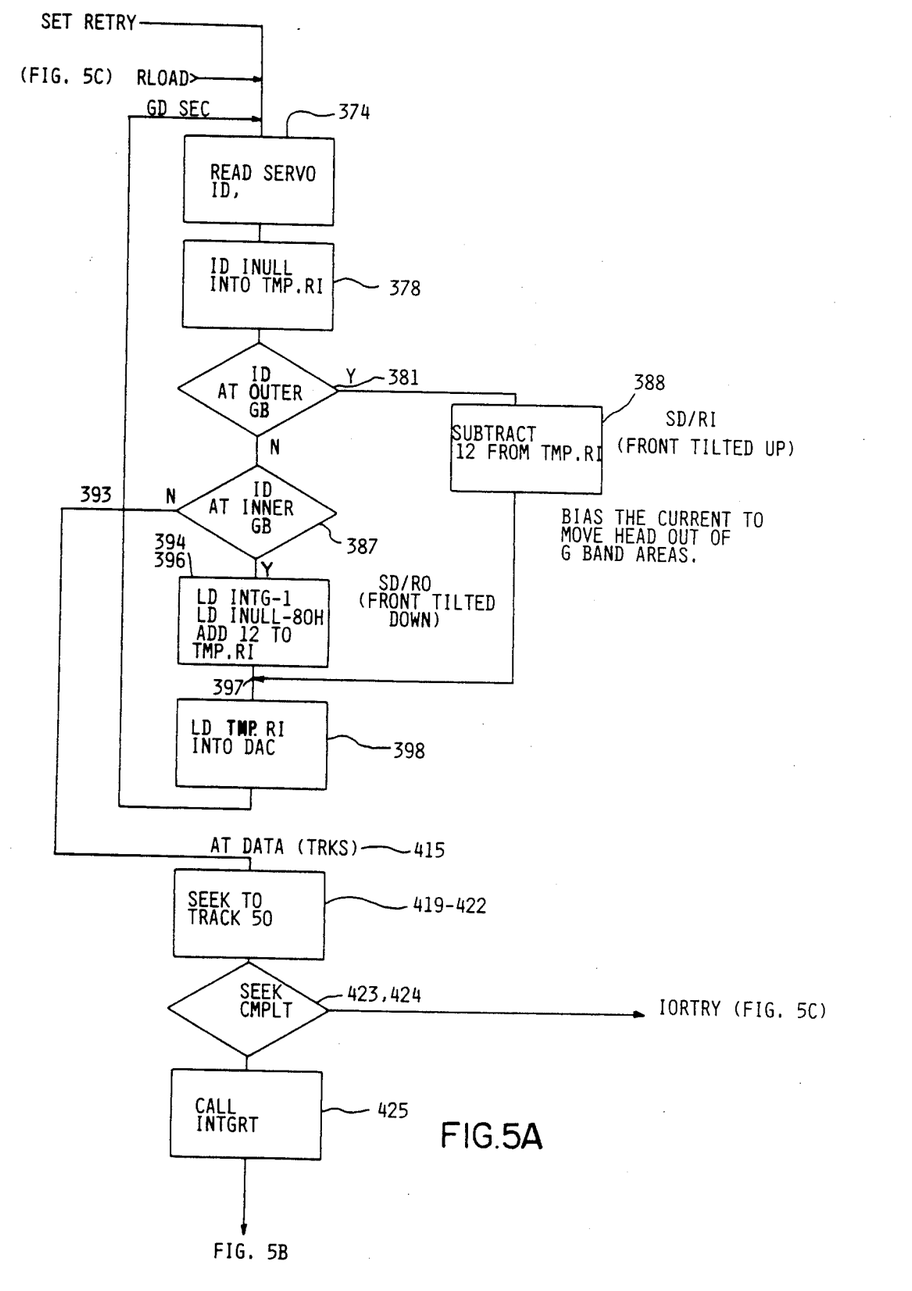
FIGS. 5A-5C show a more detailed flow diagram of an embodiment of the present, invention.
Figure 5B:
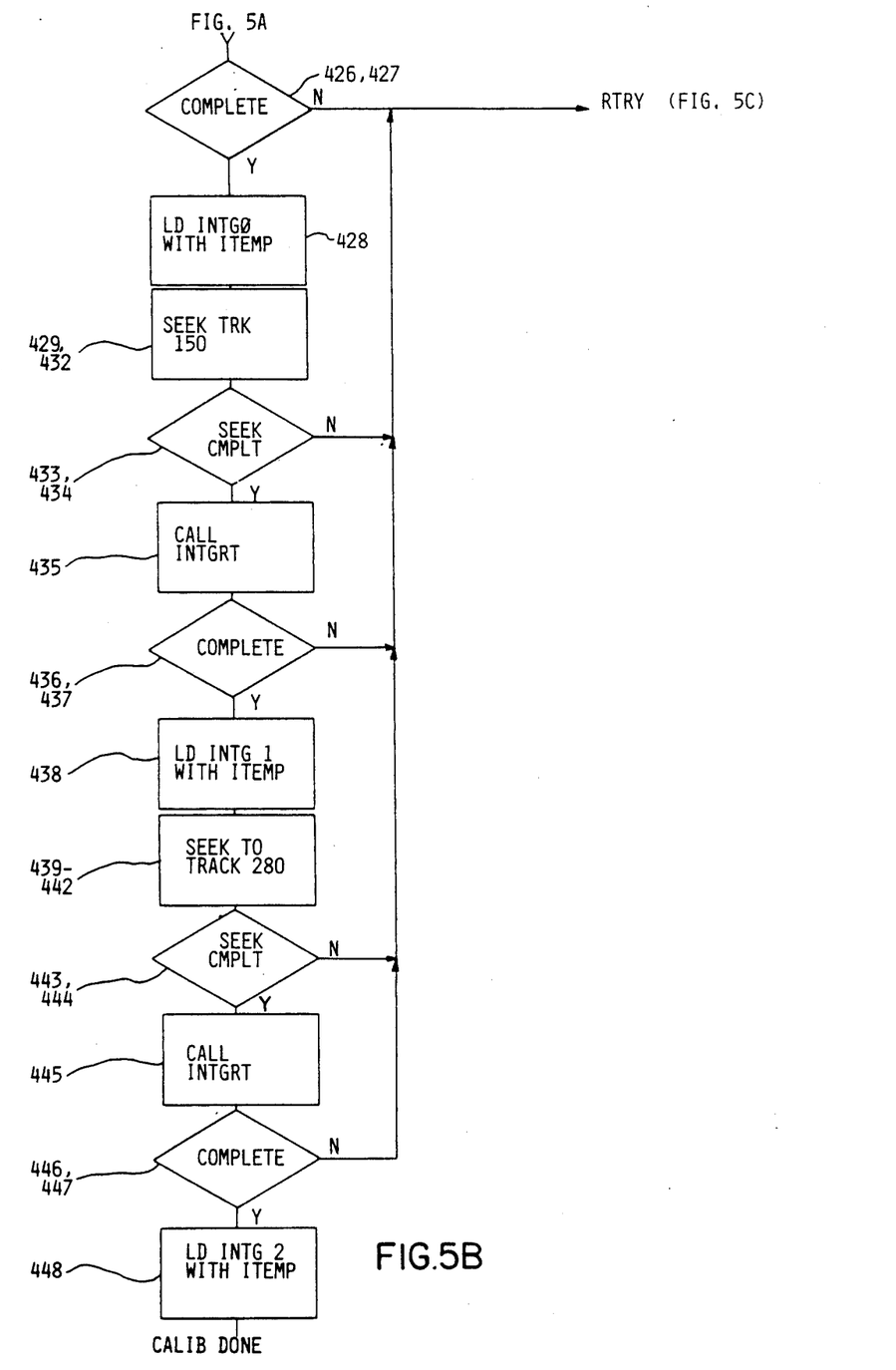
Figure 5C:
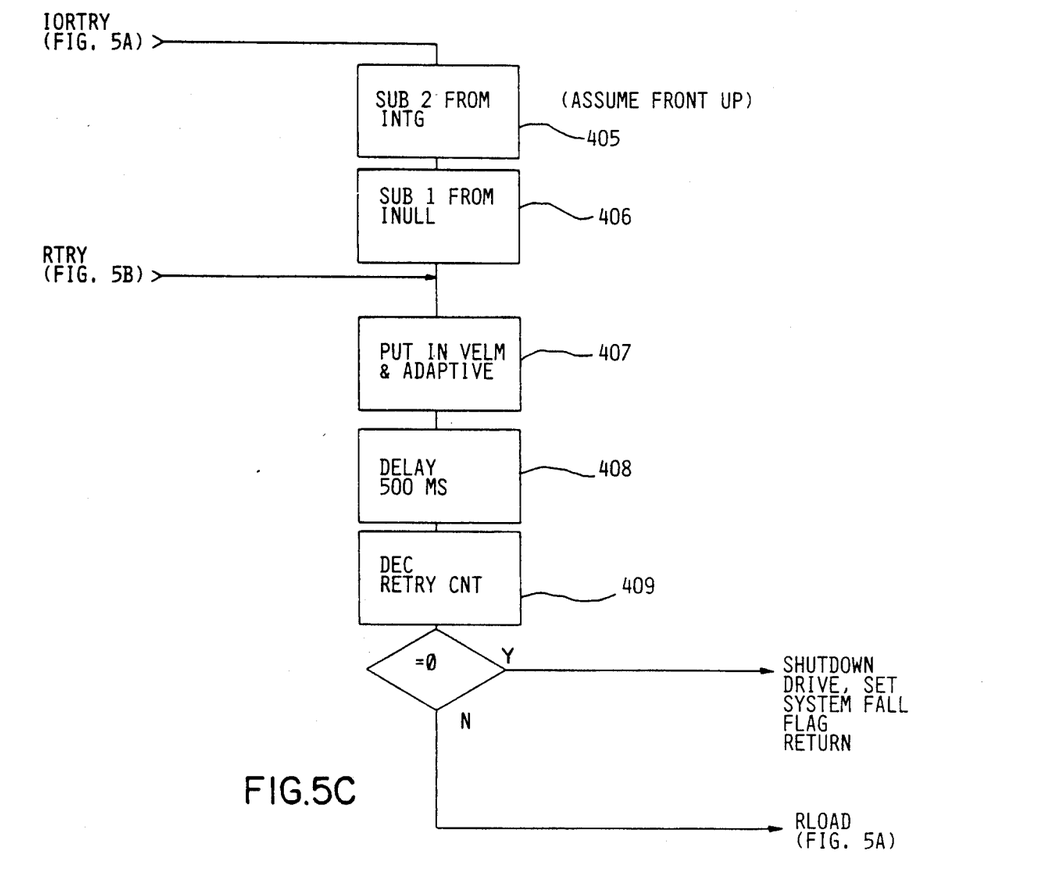
Figure 6A:
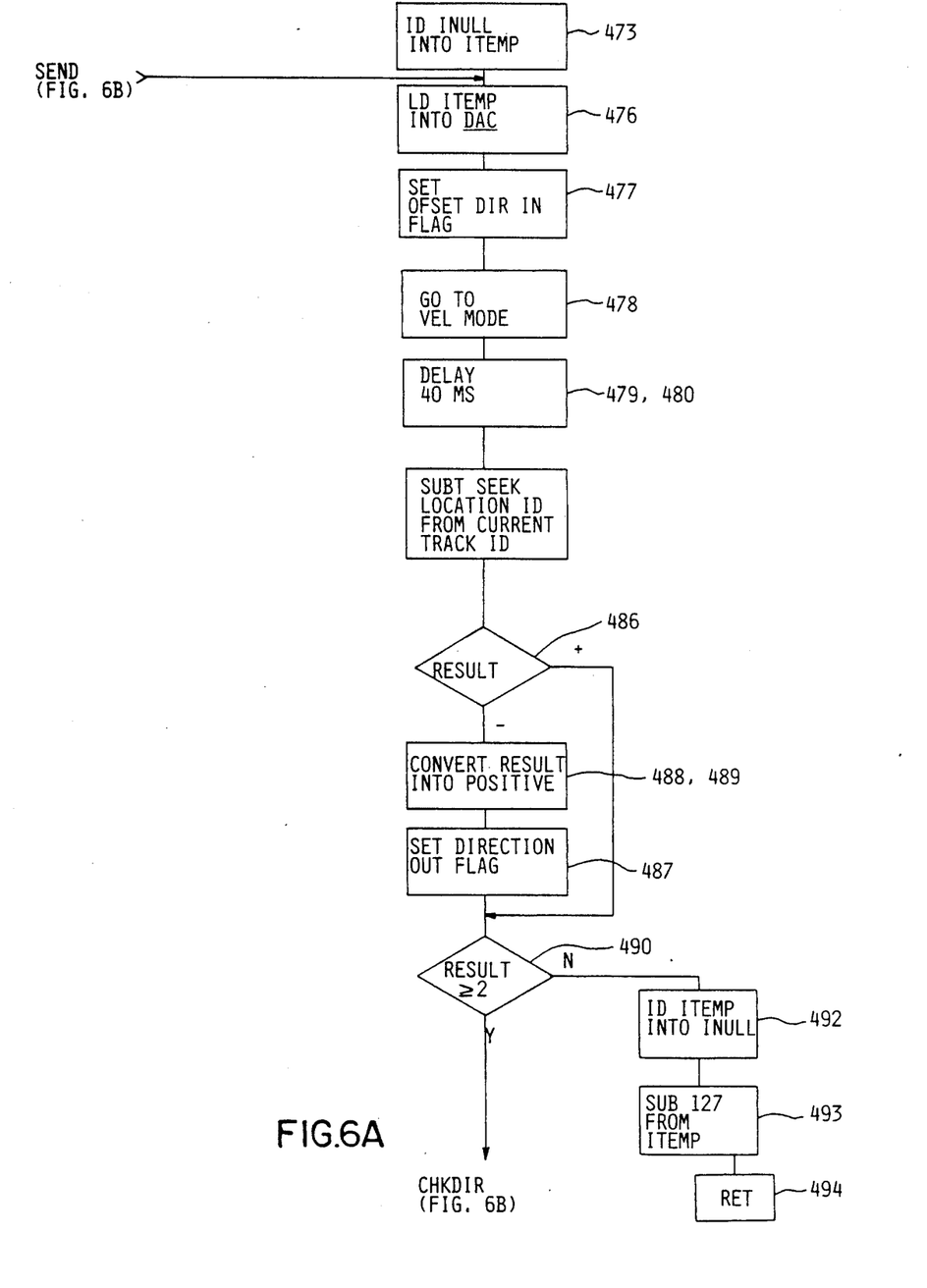
FIGS. 6A-6B more a flow diagram of a subroutine called by the flow diagram of FIGS. 6A-46C.
Figure 6B:
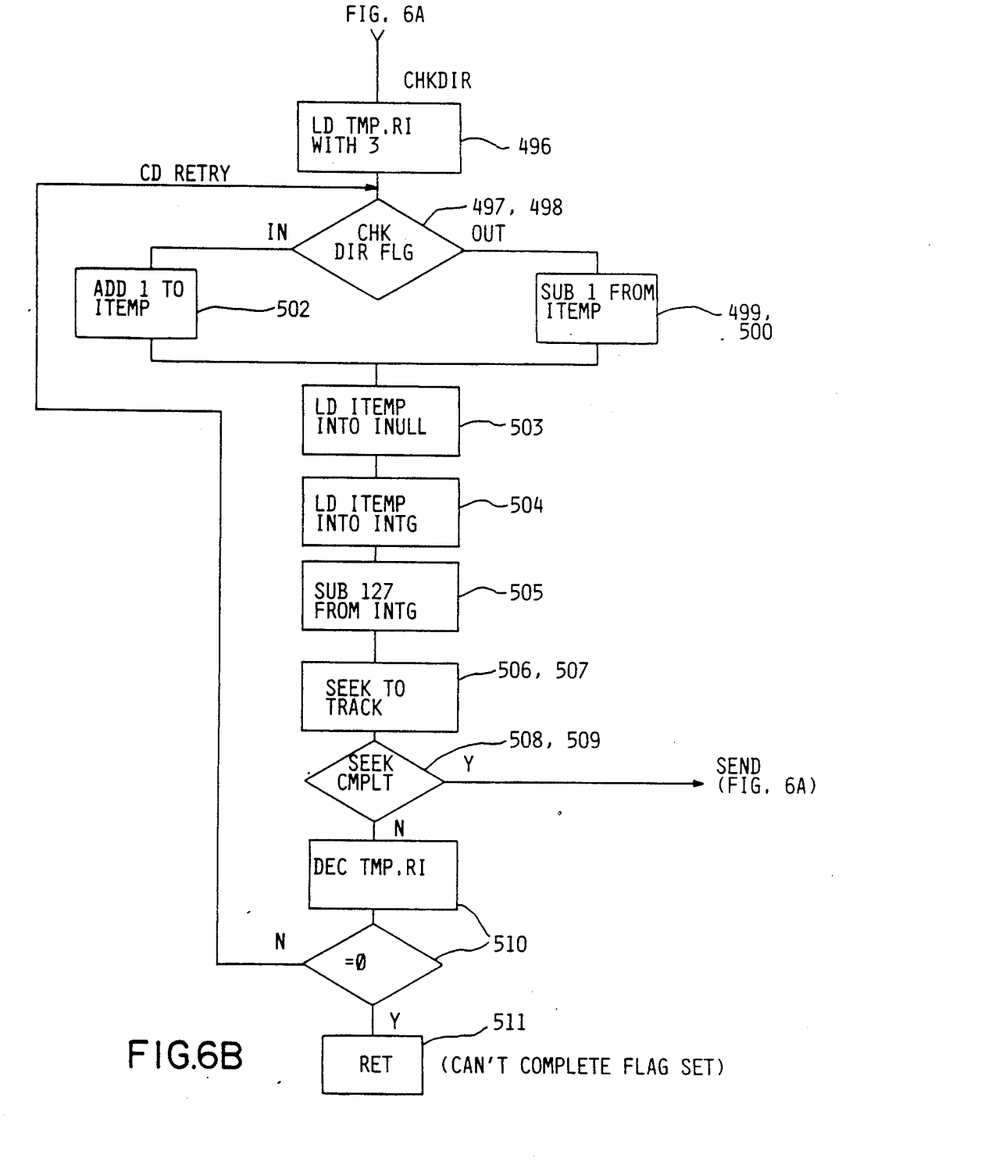

FIGS. 5A–5C are a detailed flow diagram of one embodiment of the instant invention as embodied using a Z8 microprocessor chip, which is manufactured by Zilog. FIGS. 6A and 6B are a detailed flow diagram of a subroutine named "INTGRT" which is called by the flow diagram of FIGS. 5A-5C. Appendix I is an assembly language listing of the software or firmware which can be used to control the model Z8 microprocessor 60 which is preferably used with the present invention. Of course, those skilled in the art will realize that many other microprocessors or even a state machine can be used in the practice of the instant invention and therefore the flow diagrams and the assembly language listings will then have to be modified to accommodate the particular microprocessor selected (or a state machine) as well as to accommodate modifications which may now suggest themselves to those skilled in the art.

The block numbers used in FIGS. 5A-5C and 6A and 6B correspond to the line numbers found in the left hand column of the assembly language listing of Appendix I. Both the assembly language listing and the block diagrams employ a number of variables which will be presently explained. INULL is the value outputted to the voice coil via D-A convertor 24. It is preferably an 8 bit twos compliment number with an offset equal to 7F (in hexadecimal). Thus, if INULL contains the value FF (in hexadecimal), then the voice coil receives maximum current in the outward direction. If INULL is equal to 00, the voice coil motor receives full current in the inward direction. If INULL is equal to 7F, then the voice coil receives no current. In practicing the current invention, INULL is preferably assigned a value of 7C (in hexadecimal) before correction.

INTG is the same value as INULL but it does not have the 7F offset, that is to say, it is a true twos compliment number. INTG is the value which is actually processed in the calculations performed by the microprocessor and it is thereafter converted to INULL by subtracting 7F (in hexadecimal) from it. The value of INTG is calculated for tracks 0-150, 151-251 and 251-301. For these three different ranges, INTG is specifically identified as INTG0, INTG1 and INTG2. The variable ITEMP is found in the subroutine of FIG. 6A and 6B. It is equivalent to INULL, but is a temporary variable used during calculation.

Turning to FIG. 5A, the flow chart found at blocks 378-398 (and the corresponding line numbers of the assembly language listing of Appendix I) endeavor to correct INULL so as to move the read/write head out of either the outer guard bands or inner guard bands if, during initialization, the servo system cannot recognize the track on which the head is initially located. Assuming the head is at neither the outer guard band nor the inner guard band, then a branch is made at 393 to a "ATDATA" routine which signifies that the read/write head is "at data" tracks. Thereafter, at 419-422, track 50 is sought and assuming the seek is performed properly, the subroutine INTGRT is called at 425. If the drive cannot find track 50, then either the angle at which the drive is being operated is so severe that it cannot find the track or there is some mechanical or electrical fault which cannot be overcome. If the angle is severe, then the IORTRY routine found on FIG. 5C makes adjustments to the initial value of INULL and INTG and the process is re-started by making a branch to RLOAD at 409 unless, a predetermined retry count has been exceeded, in which case the drive shuts itself down and assumes that it has a failure which it cannot overcome.

Assuming that the drive was initially able to find track number fifty (i.e., the initially assumed value of INULL or its value after adjustment by the IORTRY routine is not so bad as to cause the drive to fail completely), then the INTGRT subroutine is called at 425 to fine tune the value of INULL and assuming the routine works properly, the fine tuned value of INULL is stored as INTG0 at 428. The process then occurs again for track number 150 and the fine tuned value of INULL is then stored as INTG1 at 438. The process again occurs for track number 280 and the fine tune value of INULL for this track is stored as INTG2 at 448. At that point the values INTG0, INTG1 AND INTG2 have been stored for subsequent use by the digital servo system and therefore the servo system can get on with the initialization of the velocity mode of operation described in U.S. patent application Ser. No. 935,687 with reference to FIG. 5A thereof.

The flow diagram of the INTGRT subroutine is shown in FIG. 6A and 6B. Again, the numbers identifying the blocks correspond to the line numbers in Appendix I for the corresponding Z8 assembly language code. When the INTGRT subroutine is called, the digital control system has previously sought a predetermined track, such as track number fifty at 419-422, track number 150 at 429-432 and track number 280 at 439-442 of FIGS. 5A and 5B. The INTGRT subroutine fine tunes the value of INULL. At 478 the servo control system is shifted to its velocity mode of operation and a delay of forty milliseconds occurs at 478 and 480. Thereafter, the current track location is read and the originally sought track location is subtracted from it and if the result at 486 is negative, the value is converted to a positive number and the direction flag is set to "out" at 487. Otherwise, the direction flag is left "in" as previously set at 477. In either case, if the difference is one or less, the subroutine is exited via 492-494. Otherwise, the value of INULL is adjusted by the flow diagram shown on FIG. 6B. A retry counter is loaded with the number three at 496 and the value ITEMP is either incremented at 502 or decremented at 499, 500, depending upon the status of the direction flag at 497, 498 and the value ITEMP is loaded into INULL at 503. The originally sought track is again sought at 506, 507 and assuming the seek works correctly, a branch is made to "SEND" at 474. Otherwise, the counter originally set at 496 is decremented at 510 and if it becomes equal to zero, the routine is exited at 511 with a can't complete flag set. Assuming the seek at 508, 509 is complete, then the new value of ITEMP is loaded into the D-A convertor at 476, the direction flag is set in at 477, the servo system is switched to its velocity mode of operation at 478 and the delay again occurs at 479 and 480. If, with the updated value of ITEMP, the head does not move too much with respect to its original commanded track position, the process exits at 494. Otherwise, the value of ITEMP is again adjusted and it will be continually readjusted until such time as a value is found where the current supplied to the voice coil effectively nulls out the forces of gravity and the forces of the flex cable operating on the read/write head.

The disclosure of U.S. patent application Ser. No. 539,687 includes a flow diagram at FIGS. 5A-5C thereof. When the instant invention is used with the disclosure of that patent application, the value of INTG0, INTG1 or INTG2 preferably is summed into the error calculated immediately prior to block 254 on FIG. 5E of that application. The particular value utilized, INTG0, INTG1 or INTG2 depends upon the target track position. If the target track position is between track numbers zero and 150, then INTG0 is used. If the target track position is between track numbers 151 and 250, then INTG1 is used. If the target track position is between track numbers 251 and 301, then INTG2 is used. Additionally, when the servo system of U.S. patent application Ser. No. 935,687 shifts to its position mode of operation, the INULL value is outputted from the microprocessor to its D-A convertor 24 for application to the voice coil motor 44. Thus, in both the velocity mode of operation and in the position mode of operation, the INULL value is effective to null out the forces acting on the read/write head 50, be they gravity induced and/or flex cable induced. Also, the value of INULL varies as a function of track position to compensate for variances in the spring constant of the flex cable as a function of track position.

Figure 7:
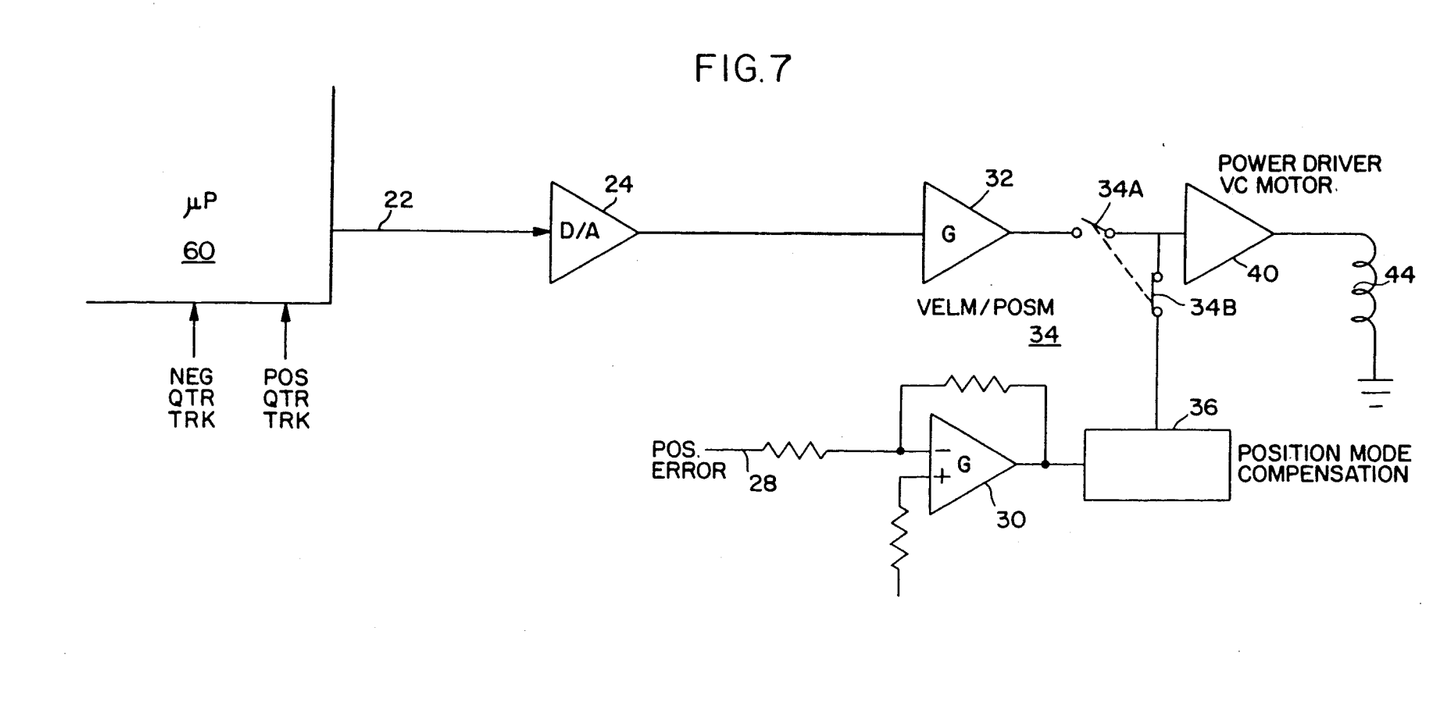
FIG. 7 is a block diagram of the servo as it operates in the position mode.

FIG. 7 is a block diagram of the circuits used to invoke the position mode at the conclusion of the velocity mode of operation of the servo-mechanism.

In the velocity mode of operation, switch 34A is closed while switch 34B is open, so that the output of the D-A convertor 24 is applied to the power amplifier 40 through a gain stage 32, for example.

Upon entering the position mode, switch 34B is closed while switch 34A is permitted to remain closed. An analog position error signal on line 28 is applied through a gain stage 30 and a compensation circuit 36 to power amplifier 40.

Since switch 34A remains closed in both the position mode and velocity modes of operation, the INULL value is effected to null out the forces acting on the read/write head 50 in both modes of operation. Switch 34A is preferably provided so as to permit the output of D-A convertor 24 to be open circuited from power amplifier 40 during the initial stages of initialization of the disk drive, that is, before the microprocessor 60 has had an opportunity to at least insert the initially assumed value for INULL into D-A convertor 24.

As is described in copending U.S. patent application Ser. No. 935,687, head 50 has a certain amount of momentum when the servo system switches from its velocity mode of operation to its position mode of operation. Indeed, the head has a tendency of overshooting the target track and certain techniques for increasing the dynamic braking of the head were discussed in the aforementioned patent application. With respect to FIG. 7 of the present application, microprocessor 60 is again responsive to negative and positive quarter track signals and based upon the polarity of the target track (odd or even) and the polarity of the quarter track signal (positive or negative), it will increase or decrease the value of INULL supplied to the D-A convertor 24. By incrementing or decrementing INULL, the POS ERR analog signal is supplemented to provide additional current to the voice coil 44 to more quickly slow down and return head 50 back toward the centerline of the commanded track. Preferably, microprocessor 60 adjusts the INULL value only if the head is off the centerline of the target track by more than a threshold value, such as threshold 21 described in U.S. patent application Ser. No. 935,687.

Having described the invention in connection with a preferred embodiment thereof, modification may now suggest itself for those skilled in the art. The invention is therefore not to be limited to the disclosed embodiment, except as specifically required by the appended claims.

What is claimed is:

1. A method of balancing the forces acting upon a workpiece controlled by a servo control system, said servo system having a velocity mode of operation and a position mode of operation, said method comprising the steps of:
   (a) moving the workpiece under control of the servo system in its velocity mode of operation to a predetermined location and then switching to its position mode of operation;
   (b) energizing a DC motor controlling the workpiece with a current of predetermined value, which predetermined value can include the value 0;
   (c) switching said servo back to its velocity mode of operation and then permitting said workpiece to change position under the influence of its environment during a predetermined period of time;
   (d) measuring the distance which the workpiece has moved during the predetermined period of time;
   (e) when the workpiece moves by more than a predetermined distance during the predetermined period of time, adjusting the predetermined current applied to the DC motor and repeating steps (a)–(e) until the distance moved during the predetermined period of time is less than said predetermined distance.

2. The method of claim 1 wherein during said velocity mode of operation, a commanded velocity signal is generated which is based upon a look up table and upon the magnitude and direction of said predetermined current, either its initial value or its adjusted value, if adjusted by step (e).

3. The method of claim 2 wherein during said position mode of operation, a commanded velocity signal is generated which is based upon the magnitude and direction of said predetermined current, either its initial value or its adjusted value, if adjusted by step (e), said command velocity signal being modified by an analog position error signal before application to said DC motor.

4. The method of claim 1, wherein the workpiece moves in a direction during step (c), wherein step (d) includes determining the direction of movement from said predetermined location and wherein step (e) includes increasing said current for oné direction of movement and decreasing said current for another direction of movement.

5. In a servo control system for a disk drive, said servo system being responsive to digital signals indicating track position data, said servo system including means for reading current track position data position data recorded on a disk disposed in said disk drive, means for generating desired velocity data in response to tracks-to-go-data, and means for generating a control signal effective to move a head of the disk drive from its current track position to a commanded track position, said servo system having both a velocity mode of operation and a position mode of operation, the improvement comprising:
   (a) means for adapting said servo system to environmental forces by generating a null value of said control signal which effectively nulls out the environmental forces, said adapting means including means for commanding said head to move to a predetermined track and, after placing the servo system in its velocity mode of operation, for delaying for a predetermined period of time and thereafter for comparing the current track position of the head with the predetermined track, the adapting means varying the null value if the difference between the current track position and the predetermined track position exceed a predetermined limit; and (b) wherein said control signal generating means is responsive to both a velocity signal generating means and to said adapting means.

6. The improvement of claim 5, wherein said adapting means again commands said head to move to said predetermined track if said predetermined limit is exceeded and wherein said adapting means includes means for selectively commanding said head to move to a new and different predetermined track if said predetermined limit is not exceeded.

7. The improvement of claim 5 wherein said control signal is coupled to a motor for moving said head in both the velocity and in the position modes of operation.

8. An adaptive servo system which modifies itself in response to environmental forces, said system comprising:

(a) a motor for moving a head of a disk drive from a current track location to a new track location;

(b) means for energizing said motor, said energizing means including:
(i) means for generating electrical energy to be applied to said motor, the amount of energy being a function of the distance between said current track location and said new track location; and
(ii) means responsive to environmental forces acting upon said head, including gravity and a spring means acting upon said head for modifying the amount of energy generated by said generating means by a predetermined value to offset said gravitational force and the force imposed by said spring means acting upon said head.

9. The adaptive servo system of claim 8 wherein said servo system includes means responsive to track position information recorded on a disk installed in the disk drive for controlling said generating means.

10. A apparatus for balancing the forces acting upon a workpiece controlled by a servo control system having position mode and a velocity mode of operation and a DC motor, comprising:

(a) means for moving the workpiece under control of the servo system to a predetermined location;

(b) means for energizing the DC motor with a null current and for permitting said workpiece to change position under the influence of its environment during a period of time;

(c) means for testing whether the workpiece moves move than a predetermined distance during the period of time and when the results of the test are true, for (i) adjusting the current applied to the DC motor and (ii) again moving the workpiece, energizing the DC motor and testing whether the workpiece moves more than said predetermined distance, (d) said means for energizing the dc motor applying said current initially at an original value and thereafter its value as adjusted by said testing means during both said position and velocity modes of operation.

11. The apparatus of claim 10 wherein said testing means adjust said predetermined current for different ranges of movement of said workpiece.

12. A method of balancing the forces acting upon a head of a disk drive controlled by a servo control system, said servo system having a velocity mode of operation and a position mode of operation, said method comprising the steps of:

(a) moving the head under control of the servo system in its velocity mode of operation to a predetermined value can include the value 0;
mode of operation;

(b) energizing a DC motor controlling the head with a current of predetermined value, which predetermined value can include the value 0;

(c) switching said servo system track to its velocity mode of operation and then permitting said head to change position under the influence of its environment during a predetermined period of time;

(d) determining the distance which the head has moved during the predetermined period of time;

(e) when the head moves by more than a predetermined distance during the predetermined period of time, adjusting the predetermined current applied to the DC motor and repeating steps (a)-(e) until the distance moved during the predetermined period of time is less than said predetermined distance.

13. The method of claim 12 wherein during said velocity mode of operation, a commanded velocity signal is generated which is based upon a look up table and upon the magnitude and direction of said predetermined current, either its initial value or its adjusted value, if adjusted by step (e).

14. The method of claim 13 wherein during said position mode of operation, a commanded velocity signal is generated which is based upon the magnitude and direction of said predetermined current, either its initial value or its adjusted value, if adjusted by step (e), said command velocity signal being modified by an analog position error signal before application to said DC motor.

15. The method of claim 12, wherein the head moves in a direction during step (c), wherein step (d) includes determining the direction of movement from said predetermined location and wherein step (e) includes increasing said current for one direction of movement and decreasing said current for another direction of movement.

16. An apparatus for balancing the forces acting upon a head of a disk drive controlled by a servo control system having a position mode and a velocity mode of operation, and a DC motor, comprising:

(a) means for moving the head under control of the servo system to a predetermined track position;

(b) means for energizing the DC motor with a null current and for permitting said workpiece to change position under the influence of its environment during a period of time;

(c) means for testing whether the head moves more than a predetermined distance during the period of time and when the results of the test are true, for (i) adjusting the current applied to the DC motor and (ii) again moving the head energizing the DC motor and testing whether the head moves more than said predetermined distance, (d) said means for energizing the motor applying said current, initially at an original value and thereafter its value as adjusted by said testing means during both said position and velocity modes of operation.

17. The apparatus of claim 16 wherein said testing means adjusts said current for different ranges of movement of said head.

* * * * *